US009637077B2

(12) United States Patent
Schnabelrauch et al.

(10) Patent No.: US 9,637,077 B2
(45) Date of Patent: May 2, 2017

(54) FRONTAL IMPACT ENERGY ABSORPTION MEMBERS

(71) Applicant: Toyota Motor Engineering & Manufacturing North America, Inc., Erlanger, KY (US)

(72) Inventors: Matthew W. Schnabelrauch, Howell, MI (US); Shunsukei Kanagai, Novi, MI (US); Naipaul D. Ramoutar, Ann Arbor, MI (US); Sagar Kulkarni, Troy, MI (US); Corinne D. Uskali, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/991,129

(22) Filed: Jan. 8, 2016

(65) Prior Publication Data

US 2016/0121831 A1 May 5, 2016

Related U.S. Application Data

(62) Division of application No. 14/492,165, filed on Sep. 22, 2014, now Pat. No. 9,248,795.

(51) Int. Cl.
*B60R 19/44* (2006.01)
*B60R 19/18* (2006.01)

(52) U.S. Cl.
CPC .............. *B60R 19/44* (2013.01); *B60R 19/18* (2013.01); *B60R 2019/186* (2013.01); *B60R 2019/1886* (2013.01)

(58) Field of Classification Search
CPC ..... E01H 5/06; E01H 5/066; A61F 13/49009; A61F 13/496; B60R 19/18; B60R 19/34; B60R 2019/1866; B60R 2019/1806; B62D 21/152
USPC ....... 293/142, 117, 120, 102, 121, 122, 132, 293/133; 280/784; 296/187.09, 187.03, 296/203.02, 187.04
See application file for complete search history.

(56) References Cited

U.S. PATENT DOCUMENTS

| | | | |
|---|---|---|---|
| 4,190,276 A | 2/1980 | Hirano | |
| 4,995,660 A * | 2/1991 | Horansky | B60R 19/26 293/132 |
| 5,080,410 A * | 1/1992 | Stewart | B60R 19/03 138/171 |
| 5,580,109 A | 12/1996 | Birka | |
| 6,007,123 A * | 12/1999 | Schwartz | B60R 19/00 293/124 |
| 6,695,368 B1 * | 2/2004 | Weykamp | B60R 19/26 293/122 |
| 6,733,054 B2 | 5/2004 | Kim | |
| 6,918,921 B2 | 7/2005 | Brady et al. | |
| 6,926,321 B2 | 8/2005 | Zipfel | |
| 6,983,964 B2 | 1/2006 | Murata | |

(Continued)

*Primary Examiner* — Kiran B Patel
(74) *Attorney, Agent, or Firm* — Dinsmore & Shohl LLP

(57) ABSTRACT

A vehicle includes a bumper beam and a bumper fascia that covers the bumper beam. An energy absorption member includes a first laterally positioned leg including a mounting flange connected to the bumper beam and a second laterally positioned leg including a mounting flange connected to the bumper beam. The first and second laterally positioned legs are located at opposite sides of a forward facing surface and are spaced-apart from each other.

6 Claims, 5 Drawing Sheets

(56) References Cited

U.S. PATENT DOCUMENTS

| | | |
|---|---|---|
| 7,070,217 B2 | 7/2006 | Longo |
| 7,163,244 B2 | 1/2007 | Meltzer |
| 7,344,008 B1 | 3/2008 | Jonsson |
| 7,559,589 B2 | 7/2009 | Nees |
| 7,581,769 B2 | 9/2009 | Wakabayashi |
| 7,954,865 B2 | 6/2011 | Schwarz |
| 8,104,804 B2 | 1/2012 | Mani |
| 8,196,979 B2 | 6/2012 | Ralston |
| 8,215,686 B2 * | 7/2012 | Czopek .................. B29C 51/10 293/133 |
| 8,348,313 B2 | 1/2013 | Chickmenahalli |
| 2008/0036225 A1 * | 2/2008 | Ji .......................... B60R 19/34 293/155 |
| 2009/0315346 A1 | 12/2009 | Schelberg |
| 2013/0249245 A1 * | 9/2013 | Sekiguchi ............ B62D 25/082 296/187.09 |
| 2013/0264135 A1 * | 10/2013 | Meyers ............... H01M 2/1083 180/68.5 |
| 2013/0270853 A1 * | 10/2013 | Ramoutar ............ B62D 27/023 296/29 |
| 2014/0015265 A1 * | 1/2014 | Ahn ........................ B60R 19/34 293/133 |
| 2014/0062129 A1 * | 3/2014 | Syed ....................... B60R 19/24 296/187.1 |
| 2014/0375082 A1 * | 12/2014 | Watanabe ............ B62D 21/152 296/187.1 |
| 2015/0054306 A1 * | 2/2015 | Kito ........................ B60R 21/34 296/187.04 |
| 2015/0054307 A1 * | 2/2015 | Kito ........................ B60R 21/34 296/187.04 |
| 2015/0108775 A1 * | 4/2015 | Nakanishi ............... B60R 19/34 293/133 |

* cited by examiner

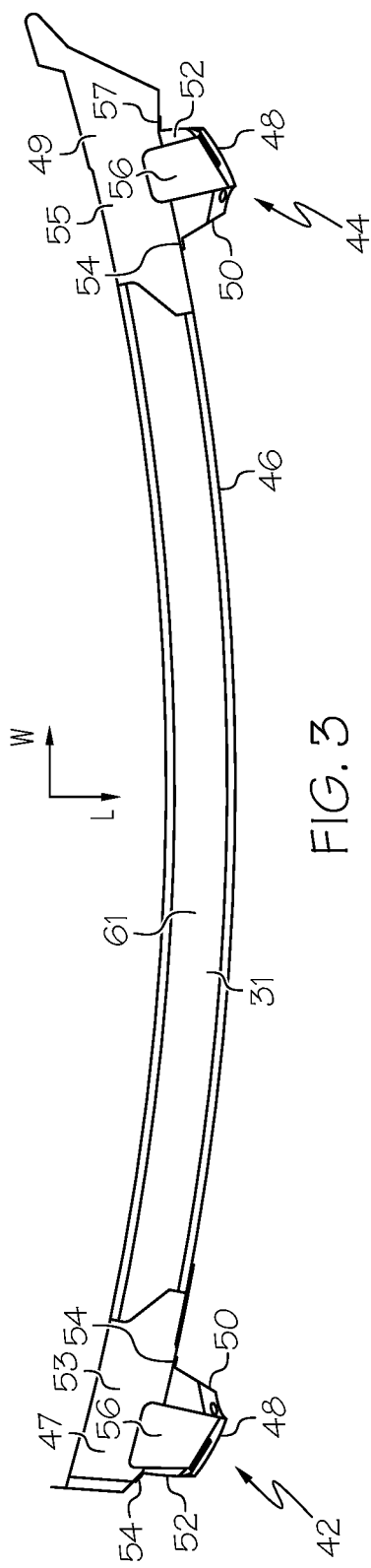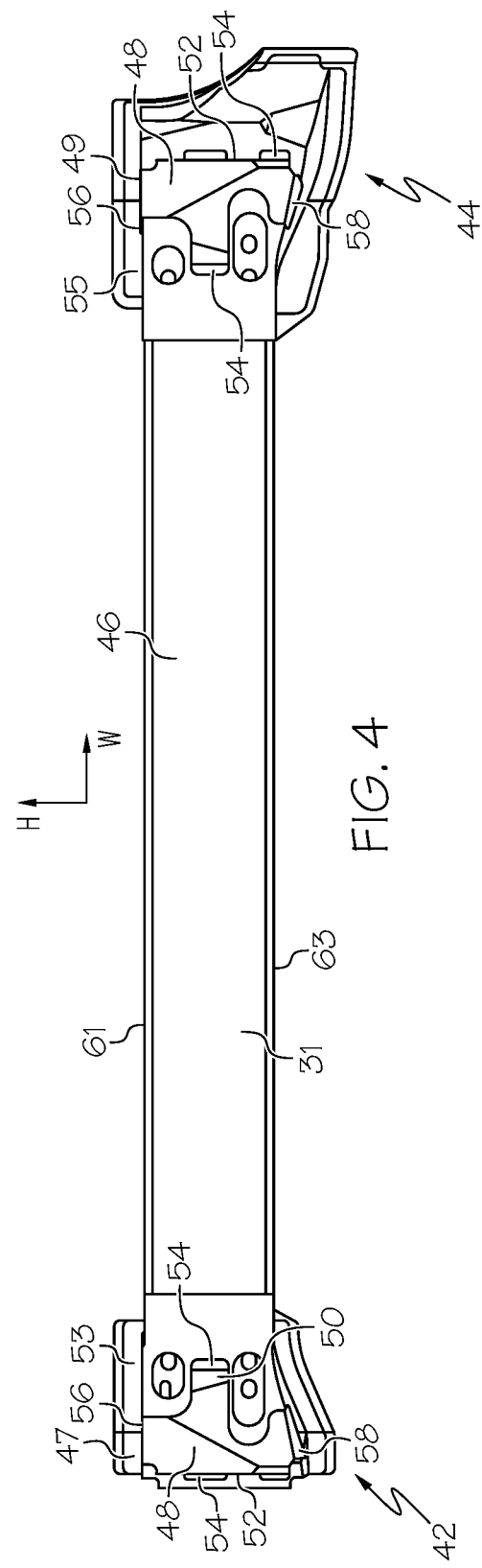

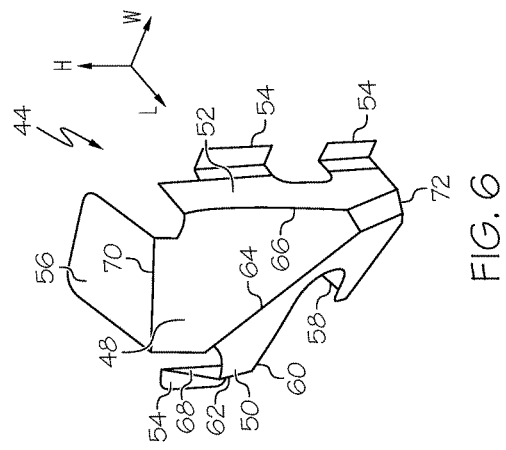
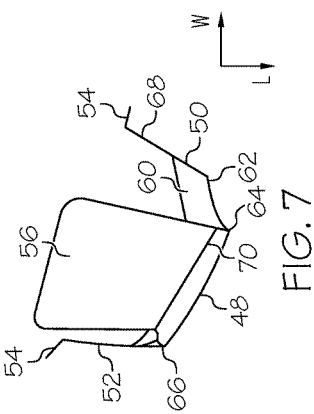
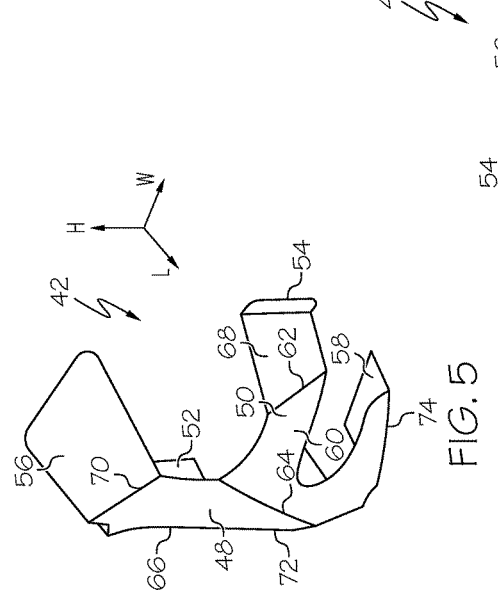

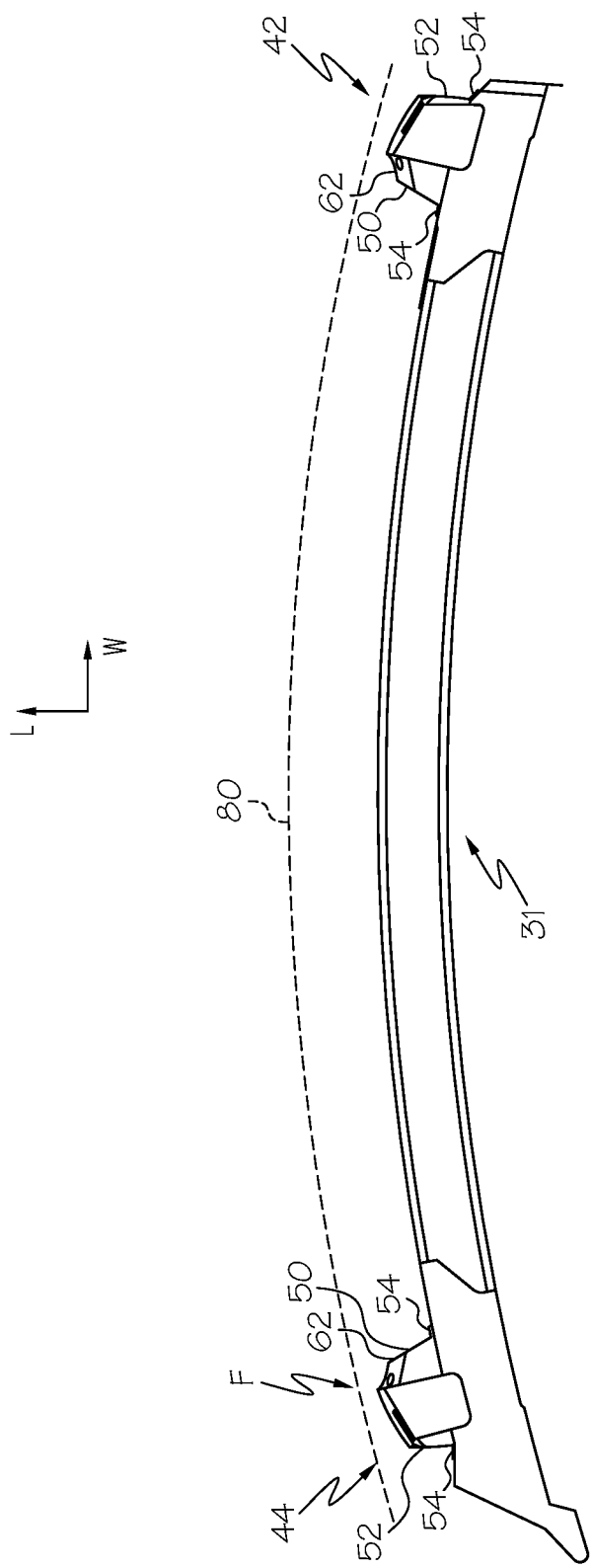

FRONTAL IMPACT ENERGY ABSORPTION MEMBERS

CROSS-REFERENCE

The present application is a divisional of U.S. application Ser. No. 14/492,165, filed Sep. 22, 2014, entitled "FRONTAL IMPACT ENERGY ABSORPTION MEMBERS," the entirety of which is hereby incorporated by reference.

TECHNICAL FIELD

The present specification generally relates to frontal impact energy absorption structures and, more particularly, to low speed frontal impact energy absorption structures.

BACKGROUND

Vehicle bumper assemblies are typically provided to provide a barrier for the hood, trunk and grille of a vehicle. Bumper assemblies often include a bumper reinforcement beam and a bumper fascia on a face surface of the bumper reinforcement beam to provide an aesthetically pleasing outer covering for the bumper reinforcement beam. The bumper assemblies are frequently provided to prevent or reduce damage to the front of the vehicle in low speed collision and provide protection for the high-speed impact absorption structures. The bumper assemblies can also protect the parking lights and headlamps in low-speed impacts. What is desired is a low-speed impact reinforcement member for a front bumper assembly that absorbs impact energy during low-speed impact conditions without altering operation of high-speed impact countermeasures, yet readily deforms during high-speed impact conditions.

SUMMARY

In one embodiment, a vehicle includes a bumper beam and a bumper fascia that covers the bumper beam. An energy absorption member includes a first laterally positioned leg including a mounting flange connected to the bumper beam and a second laterally positioned leg including a mounting flange connected to the bumper beam. The first and second laterally positioned legs are located at opposite sides of a forward facing surface and are spaced-apart from each other.

In another embodiment, an energy absorption member for reinforcing a bumper beam during a low-speed impact includes a first laterally positioned leg that connects to the bumper beam and a second laterally positioned leg that connects to the bumper beam. The first and second laterally positioned legs are located at opposite sides of a forward facing surface and are spaced-apart from each other.

In another embodiment, a vehicle includes a bumper beam and a bumper fascia that covers the bumper beam. An energy absorption member includes a first laterally positioned leg including a mounting flange connected to the bumper beam and a second laterally positioned leg including a mounting flange connected to the bumper beam. The first laterally positioned leg includes a deformation initiator arranged and configured to deform during an impact to the bumper beam at a speed below about 2 mph.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 is a top view of the bumper beam including energy absorption structures of FIG. 2;

FIG. 4 is a front view of the bumper beam including energy absorption structures of FIG. 2;

FIG. 5 is a perspective view of the energy absorption member of FIG. 1 in isolation according to one or more embodiments described herein;

FIG. 6 is a front view of another energy absorption member according to one or more embodiments described herein;

FIG. 7 is a side view of the energy absorption member of FIG. 5; and

FIG. 8 is a top view of the bumper beam including energy absorption structures of FIG. 2 with fascia illustrated.

DETAILED DESCRIPTION

Embodiments described herein are directed to an energy absorption member that is connected to a bumper reinforcement beam, between the bumper reinforcement beam and a bumper fascia that covers the bumper reinforcement beam. The energy absorption member includes a reinforcement body that can be welded to the bumper reinforcement beam. The reinforcement body is configured such that it deforms as a result of a low-speed impact while protecting vehicle structures around the bumper area, such as lamps and other parts, without altering operation of high-speed impact countermeasures of the vehicle.

Motor vehicles that incorporate elements according to the present disclosure may include a variety of construction methodologies that are conventionally known, including the unibody construction methodology as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Figure 1:
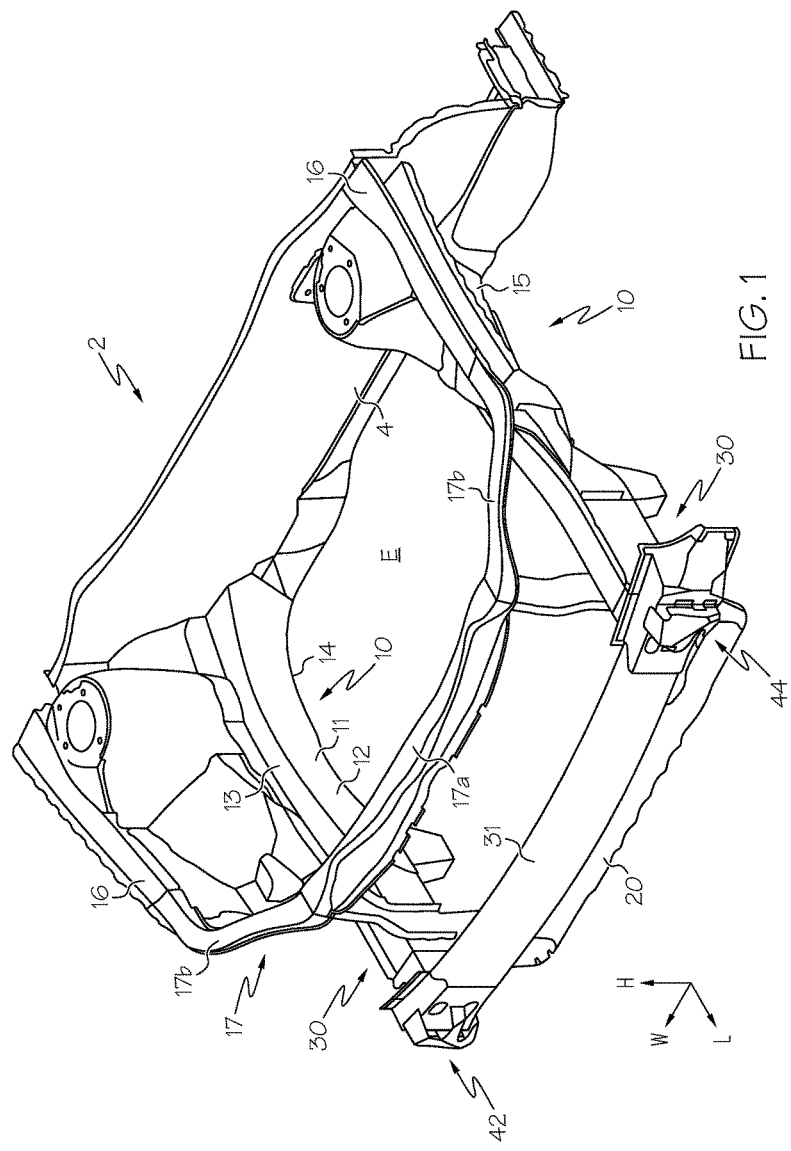
FIG. 1 is side, perspective view of a vehicle body structure according to one or more embodiments described herein.

Referring to FIG. 1, an outline of a front vehicle body structure 2 is illustrated. Right and left side frames 10 extend in a longitudinal direction of the vehicle body 2 and are disposed at a front part of the vehicle body 2. Rear ends of the side frames 10 are coupled to a toe board 4 that defines an engine room E and an unillustrated vehicle compartment. The side frames 10 include upper frames 16 that extend toward the front part of the vehicle body 2 from front ends of the right and left front pillars. The front ends of the right and left upper frames 16 are coupled at a central range in the width direction of the vehicle by a radiator panel upper 17 including a front portion 17a extending in the width direction of the vehicle and side portions 17b that are curved from both ends of the front portion 17a so as to be apart from each other toward the rear part of the vehicle body.

Each right and left side frame 10 extends along the longitudinal direction of the vehicle body with substantially a rectangular closed section by an inner panel 11, extending in the longitudinal direction of the vehicle body, and an outer panel 15. The inner panel 11 has a substantially U-shaped cross section, and includes an inner side face 12 at the inside in the width direction of the vehicle, a top surface 13 and a bottom surface 14 that are formed to be curved outward in the width direction of the vehicle along an upper edge and a lower edge of the inner side face 12. The upper edge and lower edge of the outer panel 15 are coupled to a flange, which is formed as curved at the edges of the top surface 13 and the bottom surface 14 of the inner panel 11.

A radiator panel lower 20 extends in the width direction of the vehicle and is mounted between the front ends of the right and left side frames 10. Both ends of the radiator panel body may be coupled to a bottom surface at the front ends of the right and left side frames 10. Crash boxes 30 may have a substantially rectangular cylindrical shape and can be mounted to the front ends of the right and left side frames 10. When a shock load not less than a predetermined value is input from front, the crash boxes 30 can be plastically deformed by an axial compression, and absorb the shock load. The crash boxes 30 may be referred to herein as high-speed impact countermeasures. The front ends of the right and left crash boxes 30 can serve as shock load absorbing members and can be coupled to each other by a bumper beam 31 extending in the width direction of the vehicle. The bumper beam 31 can be a strength member constituting a part of the front bumper.

Figure 2:
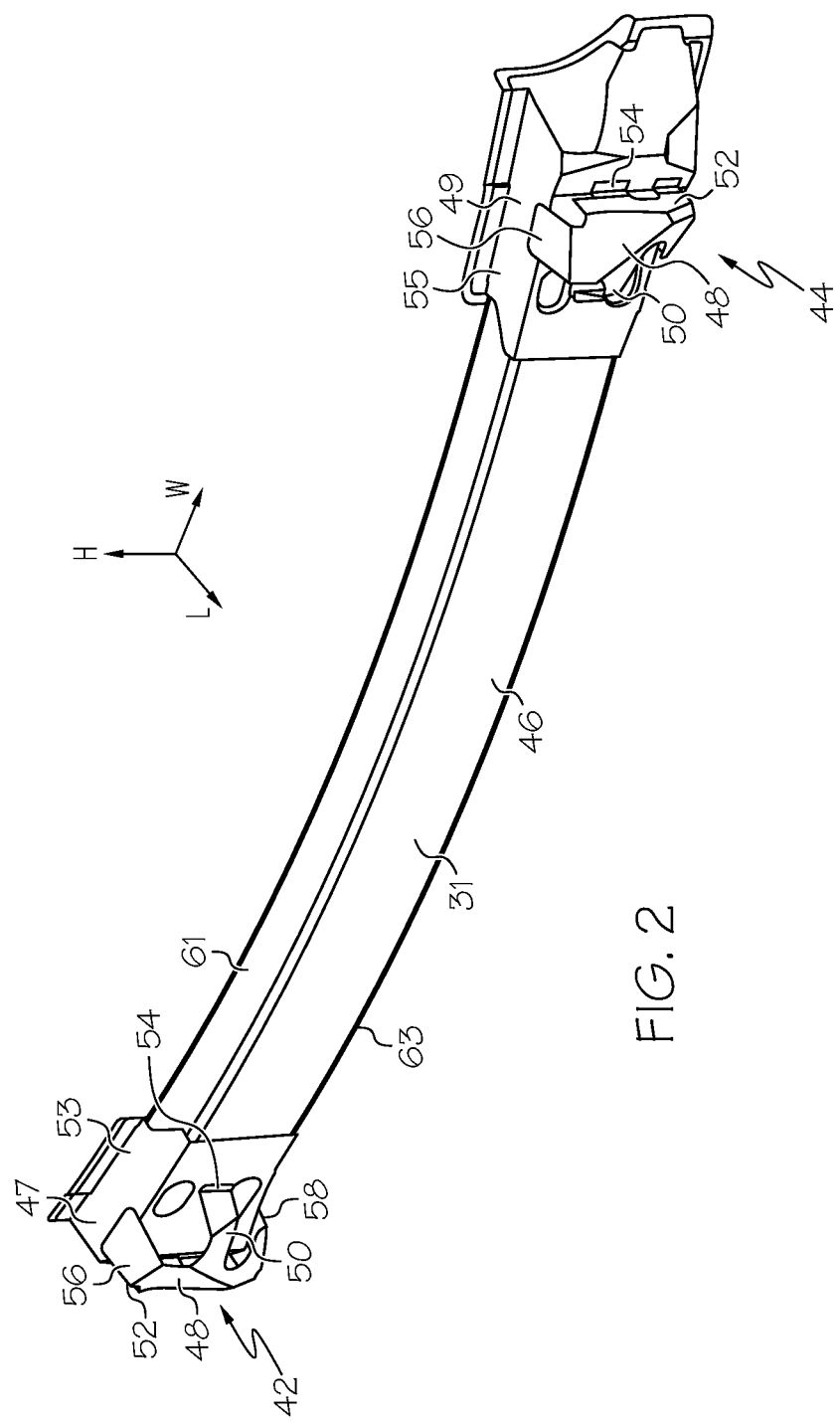
FIG. 2 is a perspective view of a bumper beam including energy absorption structures connected thereto according to one or more embodiments described herein.

Referring to FIGS. 2-4, frontal impact energy absorption members 42 and 44 are connected to a forward facing surface 46 of the bumper beam 31 at opposite ends 47 and 49. In some embodiments, the energy absorption members 42 and 44 may be connected to outer connecting brackets 53 and 55 that connect the bumper beam 31 to the crash boxes 30 that support the bumper beam 31 to the right and left side frames 10. In other embodiments, the energy absorption members 42 and 44 may be connected directly to the forward facing surface 46. Further, while two energy absorption members 42 and 44 are illustrated, there may be more than two energy absorption members.

Each energy absorption member 42 and 44 includes an outward facing portion 48 and laterally positioned legs 50 and 52. Legs 50 of the absorption members 42 and 44 face each other, while legs 52 face away from each other. The legs 50 and 52 may each include a mounting flange 54 that is used to mount the absorption members 42 and 44 to the bumper beam 31, e.g., by welding, fasteners or any other suitable connecting method. The energy absorption members 42 and 44 may also include an upper leg 56 that faces upwardly in the vehicle height direction and an opposite lower leg 58 that faces downwardly in the vehicle height direction. The upper and lower legs 56 and 58 may extend in the vehicle length direction outwardly beyond the forward facing surface 46 along sides 61 and 63 of the bumper beam 31. The upper and lower legs 56 and 58 may or may not be connected directly to the bumper beam 31 (e.g., by welding).

Referring now to FIGS. 5-7, the energy absorption members 42 and 44 are illustrated in isolation. The energy absorption member 42, 44 includes the laterally positioned legs 50 and 52 and the upper and lower legs 56 and 58 thereby providing legs 50, 52, 56 and 58 located at each opposing side of the energy absorption member 42, 44. The legs 50, 52, 56 and 58 may be connected to each other only through the outward facing portion 48. In other words, the legs 50, 52, 56 and 58 may be spaced from each other about the periphery of the outward facing portion 48 and not connected directly together forming a somewhat open structure. As will be described in greater detail below, providing the energy absorption member 42, 44 with an open structure can facilitate deformation of the energy absorption member 42, 44 under relatively low-speed impact conditions (e.g., less than about 2 mph, such as about 1.3 mph), for example, in accordance with FMVSS 581 for a 30 degree low speed impact.

The laterally positioned legs 50 and 52 include the feet or flanges 54 that can be welded or otherwise connected to the bumper beam 31, as shown by FIGS. 2-4. The leg 50 extends outwardly from an edge 64 of the outward facing portion 48 and includes a proximal portion 60 nearer the outward facing portion 48 and a distal portion 68 farther from the outward facing portion 48 that is connected to the proximal portion 60 by an outward bend 62. The bend 62 can provide a line of weakness that facilitates deformation of the leg 50 outwardly at the bend 62. In this respect, the bend 62 may be referred to as a deformation initiator. Other deformation initiators may be used, such as one or more holes or notches formed in the leg.

The leg 52 extends outwardly from an opposite edge 66 of the outward facing portion 48. In the illustrated embodiment, the leg 52 may not include a bend or other deformation initiator, which can encourage bending at the bend 62 of the leg 50. In other embodiments, however, the leg 52 may include a bend or other deformation initiator. In some embodiments, the length of the leg 52 may be shorter than the length of the leg 50 including the proximal portion 60 and the distal portion 68, which can also facilitate bending at the bend 62. Additionally, the leg 52 may include multiple, spaced apart flanges 54 (e.g., to accommodate other structures or space).

The legs 56 and 58 may extend outwardly from the outward facing portion 48 at opposite edges 70 and 72. In the illustrated embodiment, the leg 56 may not include a bend or other deformation initiator, which can encourage bending at the bend 62 of the leg 50. In other embodiments, however, the legs 56 and 58 may include a bend or other deformation initiator, such as bend 74 of the leg 58. As can be seen, the legs 56 and 58 do not include a flange such that the legs 56 and 58 can extend alongside the bumper beam 31 (FIGS. 2-4). In some embodiments, the legs 56 and 58 may not be connected directly to the bumper beam 31 and may be allowed to move relative thereto during an impact to the energy absorption member 42. In other embodiments, the legs 56 and 58 may be connected (e.g., welded) to the bumper beam 31. In some embodiments, the energy absorption member 42 may not include the legs 56 and 58.

Referring now to FIG. 8, the energy absorption member 42 is sized and shaped to be located behind the bumper fascia 80, between the bumper fascia 80 and the bumper beam 31. Any suitable shape may be used that can be located behind the bumper fascia 80 and may depend, at least in part, on the shape and dimensions of the bumper fascia 80. The energy absorption member 42 is connected to the bumper beam 31 as described above and extends toward the bumper fascia 80 to fill a gap between the bumper fascia 80 and the bumper beam 31. During a low-speed impact less than a predetermined speed (e.g., no more than about 2 mph), the force F on the face of the energy absorption member 42 can be directed through the legs 50 and 52 to the locations where the flanges 54 are attached to the bumper beam 31. Since the energy absorption members 42 are fixed to the bumper beam 31 at the locations, stresses build at the deformation initiators (e.g., bend 62), which eventually causes the leg 50 to buckle outward in the vehicle width direction. By varying the thickness of the material energy absorption member 42 or by varying the length of the legs 50, 52, the energy absorption member 42 can be tuned to allow for a predetermined about of deformation or impact stroke under a low-speed impact without causing deformation of the bumper beam 31 or other, high-speed impact countermeasures. When subjected to a high-speed impact, the energy absorption member can readily deform without altering the operation of the high-speed impact countermeasures.

Any suitable materials or combinations of materials may be used to form the energy absorption members, such as metals and/or plastics. Any suitable methods or combination of methods may be used to form the energy absorption members, such as stamping, bending, cutting, casting, etc. The welding of the energy absorption members can allow for replacement and repair of the energy reinforcement members after deformation. Welding can also allow for connection of the energy absorption members without introduction of holes into the bumper beam.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An energy absorption member for reinforcing a bumper beam during a low-speed impact, comprising:
   a first laterally positioned leg that connects to the bumper beam and a second laterally positioned leg that connects to the bumper beam;
   wherein the first and second laterally positioned legs are located at opposite sides of a forward facing surface and are spaced-apart from each other.

2. The energy absorption member of claim 1, wherein the first laterally positioned leg has a bend that separates the first laterally positioned leg into a proximal portion and a distal portion.

3. The energy absorption member of claim 1, wherein the energy absorption member comprises an upper positioned leg and a lower positioned leg located at opposite sides of the forward facing surface.

4. The energy absorption member of claim 3, wherein the upper positioned leg and the lower positioned leg are spaced-apart from the first and second laterally positioned legs and each other.

5. The energy absorption member of claim 3, wherein the upper positioned leg and the lower positioned leg are sized and arranged to extend along opposite sides of the bumper beam.

6. The energy absorption member of claim 1, wherein the first and second laterally positioned legs each include a mounting flange extending outwardly therefrom.

* * * * *